UNITED STATES PATENT OFFICE.

LUDWIG WILKENING, OF HANOVER, GERMANY.

PROCESS OF PRODUCING A STABLE FERTILIZER.

1,205,829.  Specification of Letters Patent.  Patented Nov. 21, 1916.

No Drawing.  Application filed January 14, 1915.  Serial No. 2,211.

*To all whom it may concern:*

Be it known that I, LUDWIG WILKENING, citizen of the German Empire, residing at Hanover, Germany, have invented certain new and useful Improvements in Processes for Producing a Stable Fertilizer, of which the following is a specification.

My invention relates to the manufacture of fertilizers from the residues of beet-root molasses.

The object of my invention is to provide a method for obtaining from the residues of molasses and more especially beet-root molasses a fertilizer or artificial manure which is non-hygroscopic and therefore permanently free from moisture and which has the form of a dry powder capable of being freely scattered. The well known fertilizing power of the aforesaid residues has induced quite a number of inventors to look out for means for converting said residues into a stable fertilizer, the more so, as the great percentage of water contained in said residues forms a hindrance to their being made use of more generally. Thus, for instance, it has been proposed to impregnate peat with such residues, which have previously been concentrated, or to mix them with lime and sulfuric acid in order to obtain a permanently dry powder. These methods however have proved to be failures on account of the hygroscopicity of the nitrogenous bases contained in the residues, said bases remaining unaltered in the course of manufacture and their hygroscopicity causing the fertilizer obtained by these methods to attract moisture and to lose its capability of being freely scattered. In order to do away with this drawback it has been tried to counteract the action of the hygroscopic bases mentioned before by combining them with chemical compounds such as phosphoric acid or phosphates.

In contradistinction to these methods my invention contemplates the destruction of the nitrogenous bases, especially the betaine, by bacteritic decomposition. The said bases form the most perfect culture-media for certain bacteria, before all *Bacterium azotobacter*, and are converted by fermentation into non-hygroscopic compounds. By treating the residues of beet-root molasses by this method and mixing the product so treated with peat or any other suitable material a perfectly stable and dry fertilizer is obtained which contains the whole nitrogen in form of readily assimilable compounds of simple composition.

I am aware that it is old, in order to obtain ammonia and volatile fatty acids, to treat the residue of beet-root molasses with bacteria causing fermentation. My process, however, does not contemplate the production of ammonia or fatty acids, but only a decomposition of the hygroscopic constituents of the residue.

In practising my invention I saturate powdered peat or any other suitable material with the residues of beet-root molasses said residues having a density of about ten degr. Baumé. The mass so obtained is then mixed either with a bacilli culture or with a solution containing bacteria and prepared by mixing the dilute residues with decomposed stable manure, or with some of the fermenting mass obtained in a former operation. After fermentation has started fresh residues of about twenty degr. Baumé are added until the desired percentage of nitrogen is reached. The fermentation is then brought to an end either by simply drying or by adding dilute acids. The resulting compost contains compounds of nitrogen, potassium, phosphorus and calcium in soluble form and in appropriate relations. Those bacteria which are useful for starting and assisting the production of the necessary mellowness of the soil are not killed, but are free to fulfil their task in the soil, so that the mass is valuable not only as far as its fertilizing power is concerned, but also as an exciter and promoter of the mellowness of the soil.

In order to materially accelerate the fermentation process, to increase the percentage of nitrogen and to incorporate in the mass carbon as a nutrient for the plants, the process described above can be modified in the following manner.

I have ascertained by a number of practical experiments that by introducing air and carbonic acid gas into the fermenting mass a material acceleration of the fermentation process and a very considerable increase of the percentage of nitrogen contained in the final product is obtained. In order to effect this I may introduce a mixture of air and carbonic acid gas from below into the heaps formed of the fermenting mixture of peat and molasses residue, fresh residue being continuously added during the introduction.

The terms "residues of molasses" and "residues of beet-root molasses" are herein employed to refer to those residues which remain in the stills used for distilling alcohol from the residual syrups or molasses obtained in the manufacture of beet-root sugar. As is well-known to those skilled in this art, the residual syrups or molasses obtained as a by-product in the beet-root sugar manufacture are in general sold to the distilleries for the manufacture of spirits or alcohol, and the residue from this manufacture is herein called the residues of beet-root molasses.

I claim:

1. The process for producing a dry and stable, non-hygroscopic fertilizer which consists in subjecting a mixture of residues of molasses with an absorbent fibrous material to the action of bacteric fermentation.

2. The process for producing a dry and stable, non-hygroscopic fertilizer, which consists in subjecting a mixture of residues of molasses with peat to the action of bacteric fermentation.

3. The process for producing a stable fertilizer which consists in subjecting a mixture of residues of molasses with peat to bacteric fermentation and introducing a mixture of air and carbonic acid gas into the fermenting mass.

4. The process for producing a stable fertilizer which consists in mixing a mixture of residues of molasses and peat with a solution obtained by treating decomposed stable manure with dilute residue of molasses.

5. In a process for producing a stable fertilizer by subjecting a mixture of residues of molasses and peat to bacteric fermentation, the step of adding to the fermenting mass dilute acids in order to interrupt the fermentation.

In testimony thereof I have affixed my signature.

LUDWIG WILKENING.